United States Patent [19]

Wess

[11] 4,177,681
[45] Dec. 11, 1979

[54] APPARATUS FOR ADJUSTING AND LOCKING A LINEAR ACTUATOR

[75] Inventor: Thomas B. Wess, Cincinnati, Ohio

[73] Assignee: The United States of America as represented by the Secretary of the Air Force, Washington, D.C.

[21] Appl. No.: 893,868

[22] Filed: Apr. 6, 1978

[51] Int. Cl.² .............. F16H 21/44; F16H 21/54; F16H 25/18
[52] U.S. Cl. ........................ 74/110; 74/522; 74/586; 92/13.41; 92/13.8; 244/85; 403/118; 403/320
[58] Field of Search ............... 244/85; 92/13.41, 13.8, 92/13.4; 188/196 A, 196 C; 100/257; 74/522, 110, 586; 403/118, 320, 343

[56] References Cited

U.S. PATENT DOCUMENTS

| 1,639,735 | 8/1927 | Jones | 74/586 X |
|---|---|---|---|
| 1,811,913 | 6/1931 | Browall | 188/196 C |
| 1,837,473 | 12/1931 | Neveu | 188/196 C |
| 2,300,831 | 11/1942 | James | 92/13.41 |
| 2,431,070 | 11/1947 | Nelson | 74/110 |
| 2,442,306 | 5/1948 | McCormick | 92/13.41 |
| 2,619,304 | 11/1952 | Feeney et al. | 244/85 |
| 2,716,965 | 9/1955 | Klamp | 92/13.8 |
| 2,753,134 | 7/1956 | Gordon et al. | 244/85 |
| 2,861,758 | 11/1958 | Howard | 244/9 |
| 2,972,898 | 2/1961 | Hartel | 74/105 |
| 2,976,844 | 3/1961 | Goldring | 92/13.41 |
| 3,232,182 | 2/1966 | Gilbert | 92/13.41 |
| 3,392,909 | 7/1968 | Turner | 91/189 |
| 3,763,747 | 10/1973 | Beichel et al. | 74/110 X |
| 3,815,471 | 6/1974 | Kobelt | 91/189 |
| 3,893,544 | 7/1975 | Means | 188/196 A |
| 3,904,301 | 9/1975 | Schroeder | 403/320 X |
| 4,114,250 | 9/1978 | Dent | 403/343 X |

FOREIGN PATENT DOCUMENTS

| 19963 | 3/1972 | Australia | 92/13.8 |
|---|---|---|---|
| 421989 | 3/1911 | France | 74/586 |
| 32395 | 11/1927 | France | 403/343 |
| 724755 | 2/1955 | United Kingdom | 244/226 |

*Primary Examiner*—Leslie Braun
*Attorney, Agent, or Firm*—Joseph E. Rusz; Arsen Tashjian

[57] ABSTRACT

A cylindrical linear actuator suitable for installation in a confined area and capable of infinite stroke adjustment over its scheduled travel and lockable at any position of its designated stroke includes overlapping and combining rod end stroke adjustments to minimize actuator length. Electrical feedback is precalibrated to give a known signal proportional to the actuator stroke and to the position of the load clevis thereby always giving the correct position of the load.

3 Claims, 2 Drawing Figures

APPARATUS FOR ADJUSTING AND LOCKING A LINEAR ACTUATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to a hydraulic linear actuator and, more particularly, the invention is concerned with providing an adjustable and lockable actuator suitable for use in confined areas for power actuation of a variable turbine nozzle and the like of a jet engine.

Modern high speed aircraft which reach speeds in the transonic range and beyond require that the variable nozzle of the turbine be adjustable and lockable over a wide range of configurations. This is generally accomplished by providing suitable actuators which include bellcranks and/or similar lever arrangements. Since it is extremely undesirable from the standpoint of increased aerodynamic drag to have any portion of the actuating mechanism protrude beyond the surface of the aircraft, the provision of an actuator which meets the requirement of being mechanically lockable at any position of its designated stroke within a small design envelope presents an extremely difficult problem. In addition, the actuator design must be capable of setting any desired stroke length at any position between the limits of the stroke. Electrical feedback is required to be proportional to the position of the load. Presently available actuators capable of satisfying the capabilities outlined require space that far exceeds that available in the nozzle portion of the turbine engine for mounting therein.

SUMMARY OF THE INVENTION

The present invention is concerned with providing an adjustable and lockable actuator wherein the rod end adjustment and the stroke adjustment are overlapped and combined thereby minimizing overall actuator length.

Accordingly, it is an object of the invention to provide a linear actuator capable of meeting the requirements for actuation of the variable turbine nozzle of a jet engine.

Another object of the invention is to provide a linear actuator which can be mechanically locked at any position of its designated stroke while requiring a minimum of space for installation so that it is capable of being housed entirely within a relatively thin walled section of the nozzle area.

Still another object of the invention is to provide a linear actuator capable of setting any desired stroke length at any position between the limits of the stroke within the small design envelope.

A further object of the invention is to provide a linear actuator wherein the rod end adjustment and stroke adjustment are overlapped and combined to minimize actuator length and allow installation within the available internal space in the nozzle wall.

These and other objects, features and advantages will become more apparent after considering the following detailed description taken in conjunction with the annexed drawings and appended claims.

DESCRIPTION OF A PREFERRED EMBODIMENT

Figure 1:
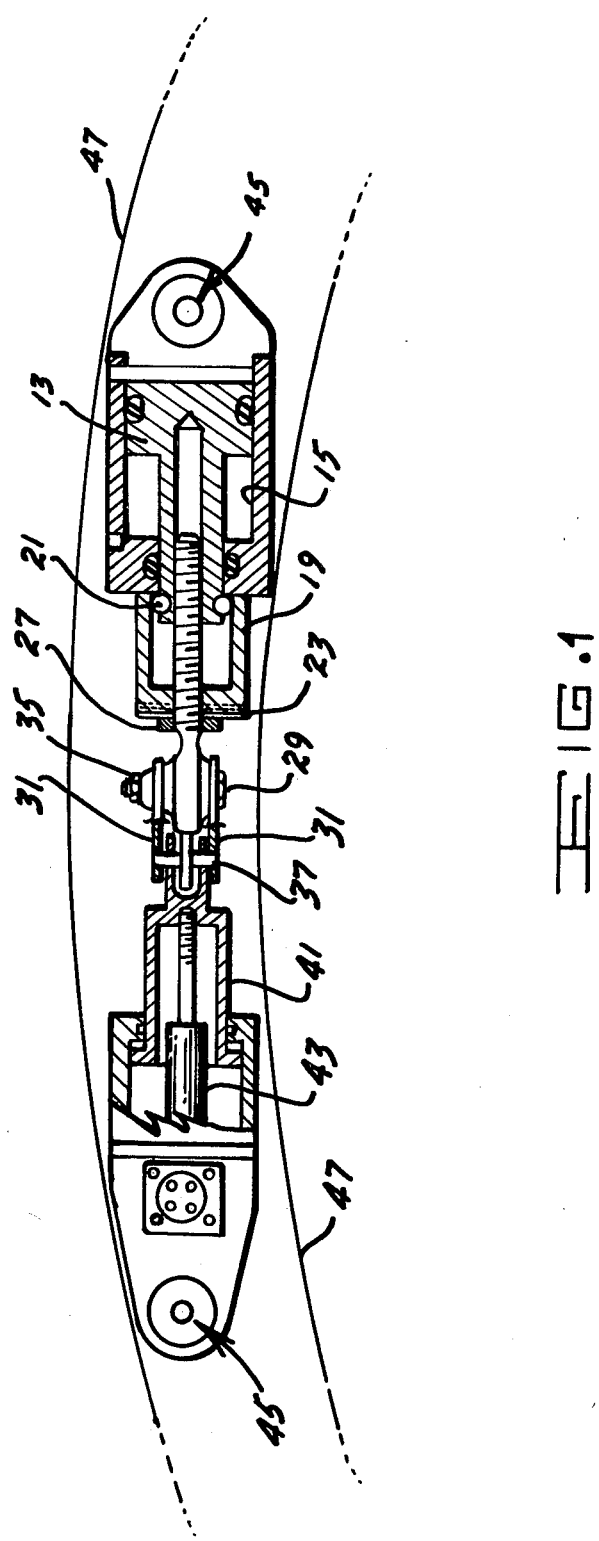
FIG. 1 is a view in cross-section of an adjusting and locking linear actuator according to the invention showing the unit fully assembled and installed in its design envelope.
Figure 2:
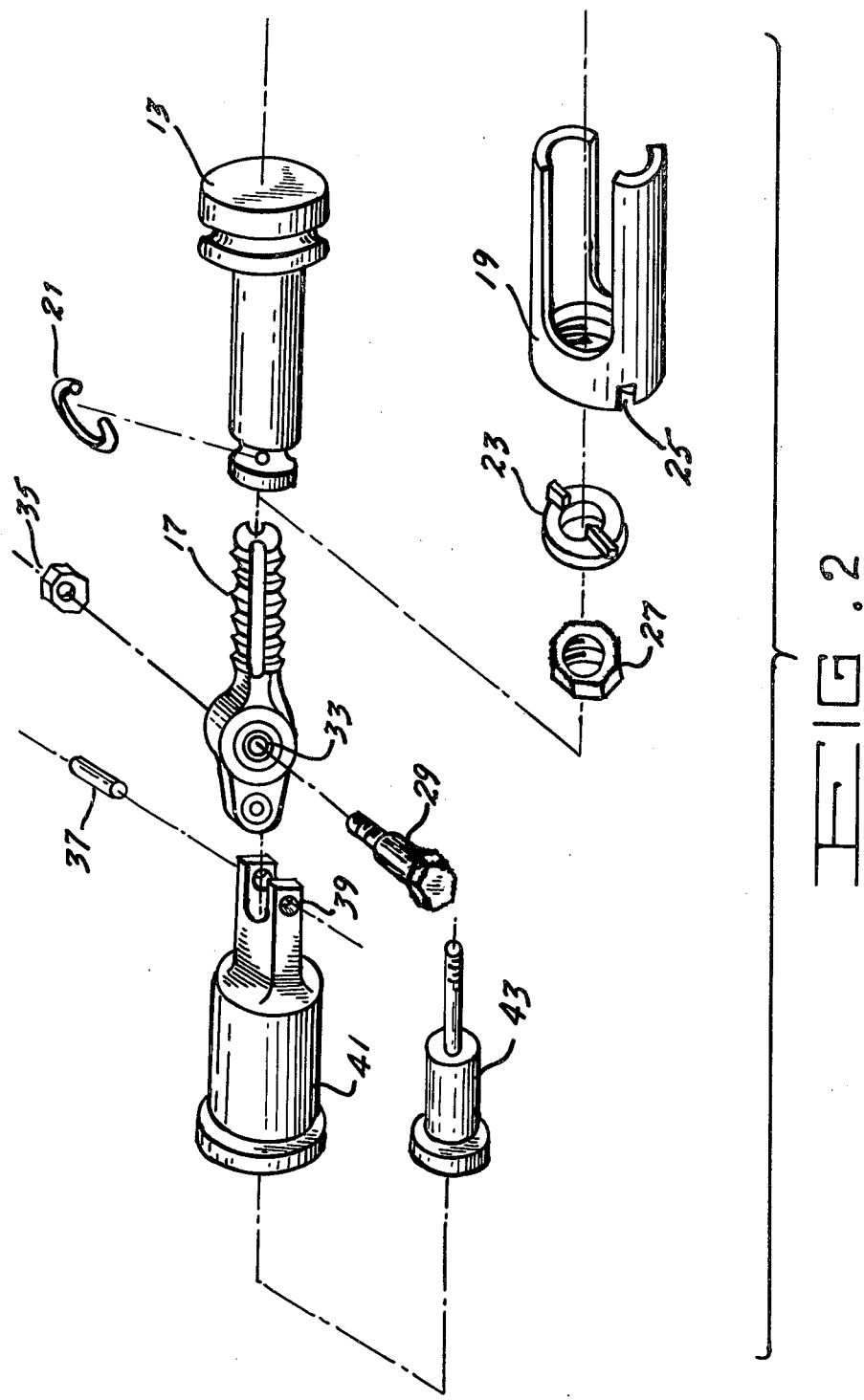
FIG. 2 is an exploded view of the actuator of FIG. 1 showing the relationship of the various elements to one another.

Referring now to the Figures wherein like reference numerals are used to denote the same elements in the two views, there is shown a linear actuator which meets the requirement of being mechanically lockable in any position of its designated stroke for installation in a design envelope of restricted space. The actuator according to the invention as shown can be adjusted to any desired stroke length at any position between the limits of stroke.

By overlapping and combining rod end adjustment and stroke adjustment, the actuator length is held to an absolute minimum without sacrificing ease of operation and installation. The linear actuator includes an actuator piston 13 for linear movement in the cylindrical actuator body 15. An actuator rod end 17 is threadably attached to the piston 13 and moves therewith. An actuator retract stop 19 effectively limits the travel of piston 13 within the body 15. An actuator spring lock 21 locks the rod end 17 in position in the piston 13 and prevents further relative movement therebetween. A lock 23 engages a groove 25 on the retractor stop 19 and a retaining nut 27 threaded on the rod end 17 holds the lock 23 in position.

A shoulder bolt 29 passes through aligned openings in the load clevis attachments 31 and the opening 33 in the actuator rod end 17. A nut 35 holds the shoulder bolt 29 in position after installation. A pin 37 passes through other aligned openings in the clevis attachments 31 and through the openings 39 in the load piston 41 for attaching the load to the actuator. A load piston rod 43 is threadably attached to the load piston 41 for movement therewith. A uniball mount 45 is formed at the outer end of the actuator and the outer end of the load. The assembled actuator as shown in FIG. 1 is installed in the design envelope 47 which is severely limited in size and shape thereby causing the actuator to be correspondingly limited to the shape shown.

MODE OF OPERATION

To lock the actuator at any position of its stroke, the operator proceeds as follows: remove the nut 35 and shoulder bolt 29, thus detaching the actuator from the load. Remove the pin 37 detaching the load piston 41 from the actuator. Move the load clevis 31 to the desired position in which it is to be locked. Extend the actuator piston 13 to its extend stop. Remove the actuator rod spring lock 21 and thread rod end 17 into piston 13 until the rod end mounting hole is in line with the load clevis mounting hole 39. Install the clevis 31 on its actuator mount and insert the pin 37. Lock the actuator rod end 17 to the load clevis 31 with the shoulder bolt 29 and lock nut 35. Thread the retaining nut 27 away from the retract stop 19 and remove lock 23 from its detent 25. Thread the actuator retract stop 19 until it bottoms on the actuator body 15. Install lock 23 and thread retaining nut 27 to capture lock 23. The actuator has now locked the load in position. Since the electrical feedback is precalibrated to give a known signal proportional to its stroke, and since its position is proportion to the load clevis position by means of its attachment, the electrical feedback always gives the correct position of the load.

To adjust the actuator to produce any desired stroke within its maximum travel, the operator proceeds as follows; remove the nut 35 and shoulder bolt 29 and pin 37. Move the load clevis to the initial position of the desired stroke. Extend the actuator piston 13 to its extend stop. Retract the actuator the exact distance of the desired stroke. Remove the actuator rod spring lock 21 and thread the rod 17 into the piston 13 until the rod end mounting hole is in line with the load clevis mounting hole 39. Install clevis on its actuator mount and insert pin 37. Lock actuator rod end 17 to load clevis 31 with shoulder bolt 29 and lock nut 35. Thread retaining nut 27 away from the retract stop 19 and remove lock 23 from its detent 25. Thread actuator retract stop 19 until it bottoms on the actuator body 15. Install lock 23 and thread the retaining nut 27 to capture the lock 23. The actuator is now adjusted for the desired stroke and the electrical feedback will be correct for that portion of the stroke set.

Although the invention has been illustrated in the accompanying drawings and described in the foregoing specification in terms of a preferred embodiment thereof, the invention is not limited to this embodiment or to the preferred configuration shown. It will be apparent to those skilled in the art that my invention could have extensive use in other operations where it is necessary to provide actuation capabilities, particularly in confined areas. For example, the extremely thin airfoils in present day high performance aircraft allow very limited space wherein an actuator for controlling the ailerons can be mounted. The hereinbefore described invention would permit actuation of the ailerons in the limited space available without any portion of the actuation mechanism protruding beyond the contour of the wing surface.

Having thus set forth the nature of my invention, what I claim and desire to secure by Letters Patent of the United States is:

1. A linear actuator for actuation of a turbine nozzle and the like having infinite stroke adjustment and lockable at any position of its designated stroke, said actuator comprising a cylindrical actuator body, an actuator piston disposed within said actuator body for sliding movement therein, an actuator rod having a threaded portion thereon threadably attached to said actuator piston and extending outwardly therefrom, the extending portion of said actuator rod being adjustable in length, an actuator retract stop threadably attached to said actuator rod for limiting the travel of said actuator piston within said actuator body, means for locking said actuator rod in position in said actuator piston to prevent relative movement therebetween, means for locking said actuator retractor stop in position against said actuator body, load clevis attachments having openings therein in alignment with openings in said actuator rod, a shoulder bolt positioned through the aligned openings in said actuator rod and said clevis attachments, and a load piston pivotably attached to said actuator rod for linear movement therewith, whereby the load piston which is locked in position serves to control an electrical feedback precalibrated to give a known signal proportional to its stroke thereby indicating the position of the load.

2. The linear actuator defined in claim 1 wherein said means for locking said actuator rod in position in said piston includes an actuator spring lock having axially oriented bent end portions passing through openings in said actuator piston and engaging longitudinal slots on opposite sides of the threaded portion of said actuator rod.

3. The linear actuator defined in claim 1 wherein said means for locking said actuator retractor stop in position against said actuator body includes an actuator stop lock having axially oriented ear portions of the inner face thereof in engagement with axially oriented grooves on the adjacent face of said actuator retract stop and a retaining nut for holding said actuator stop lock in place against said actuator retract stop.

* * * * *